C. W. GARLAND.
AIR OR STENCH-TRAP.

No. 178,137. Patented May 30, 1876.

Witnesses
Edward K. Osborn
G. E. Schnepp

Inventor:
Chas. W. Garland
By C. W. M. Smith,
Atty.

UNITED STATES PATENT OFFICE.

CHARLES W. GARLAND, OF SAN FRANCISCO, CALIFORNIA.

IMPROVEMENT IN AIR OR STENCH TRAPS.

Specification forming part of Letters Patent No. 178,137, dated May 30, 1876; application filed January 27, 1876.

*To all whom it may concern:*

Be it known that I, CHARLES WASHINGTON GARLAND, of San Francisco, State of California, have invented an Improved Air or Stench Trap, of which the following is a specification:

The object of my invention is to provide an adjunct to vessels of any kind, such as a wash-bowl, water-closet bowl, urinal, or sink, which discharges by pipes or sewers, up which a current of foul air is liable to pass. It consists in the combination of the several parts, all as more fully hereinafter explained.

A curved pipe, having a valve at its extremity, is attached to the eduction-pipe a little below the ball-valve chamber, for the admission of atmospheric air to the chamber, and prevents the water in the trap from being forced out or drawn off by the evacuation of pipes beneath.

It is a well-known fact that in dwellings having apartments containing wash-bowls, water-closets, and the like, with pipes leading into one common eduction-pipe or sewer, it is a difficult matter to prevent the return of foul gases to the rooms. This is obvious from the fact that when water is admitted into the sinks or basins of the lower stories its exit to the sewer creates a vacuum and sucks out the water in the trap above, and thus permits the return of foul gases to the apartments, until the traps above are again supplied with water, and often, even when the traps are filled with water, foul gases will escape into the apartments through the water, caused by fermentation and upward pressure from below the trap; and to prevent this occurrence is mainly the object of my invention.

Figure 1:
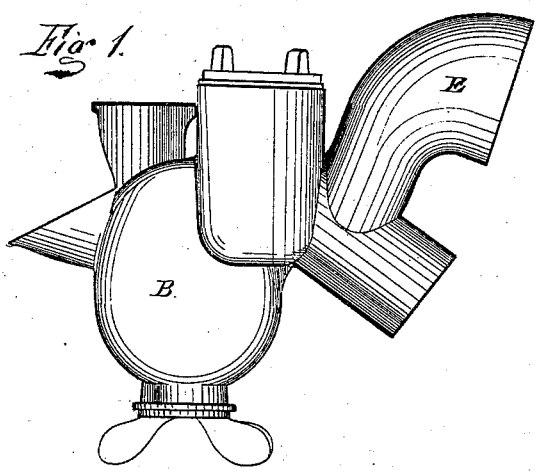
Figure 2:
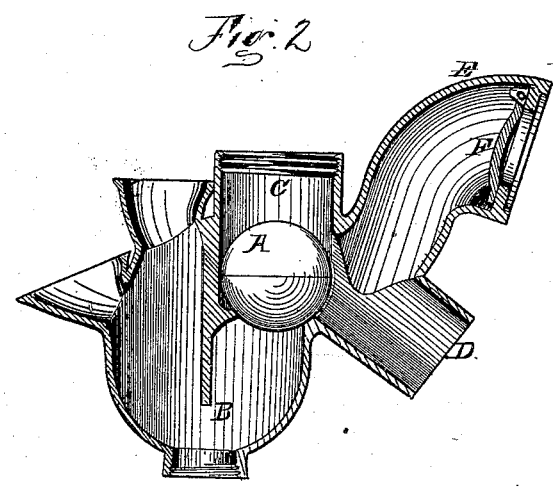
Figure 3:
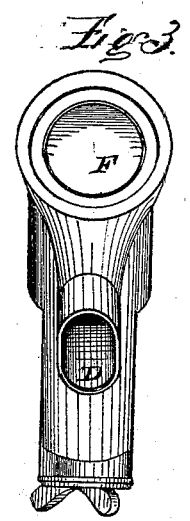

Referring to the accompanying drawings, and to the letters of reference marked thereon, for a more full illustration and description of my invention, Figure 1 is an elevation; Fig. 2, a longitudinal section; Fig. 3, a front view taken from the right side of Fig. 1.

A represents a ball or semi-spherical valve placed above the trap B, at one side of it, and having sufficient room to play up and down in the box or chamber C. This valve is loaded, so that when it is raised from its seat it will return again to it by its own gravity when the pressure is removed. It is ground to its seat, so as to be air-tight.

The sides of the eduction-pipe D are compressed, so as to form an oblong hole, that the pipe may not become choked by the valve.

From the eduction-pipe extends a curved vent-pipe, E, which is provided at its lower extremity with a clapper-valve, F. This valve may be loaded also, and may be a ball-valve or semi-spherical, in which latter case it need not be hinged, but be permitted to fall to its seat by gravity or atmospheric pressure, as it is only employed as an air-valve to admit air to the valve-chamber C, and thereby prevent the valve from being raised when it is necessary to keep it in place.

The valve A always remains in its seat, unless water is renewed in the trap from the basin to which it is attached, and being air-tight the gases are prevented from passing up through the water in the trap, as would be the case in its absence.

The operation will be as follows: Water being admitted through the basin or pipe, filling the trap, lifts the valve A, and passes off, in the usual way, through the eduction-pipe into the sewer, and when the supply is shut off, or the pressure ceases, the valve returns to its seat; but should water be drawn from below this trap, or so as to create a vacuum when the valve A is at rest, then, in that case, the air will rush into the chamber C and open the valve F inward, and supply a sufficient quantity of air to prevent the water in the trap from being drawn out and the valve A from being lifted; consequently this valve A remains shut, as sufficient air is received through the valve F to supply the place of the air removed, or the suction produced by water passing off through pipes beneath.

By this means a siphon is prevented from being formed in the pipes.

Having thus described my invention, what I claim as new, and desire to secure by Letters Patent, is—

The combination, with the trap B, of the chamber C, the loose ball-valve A, the exit-pipe D, the vent-pipe E, and valve F, when the several parts are constructed and arranged substantially as described and shown.

In witness whereof I have hereunto set my hand and seal this 15th day of January, 1876.

CHARLES W. GARLAND. [L. S.]

Witnesses:
C. W. M. SMITH,
PHILIP MAHLER.